(12) United States Patent
Cheng

(10) Patent No.: US 9,199,660 B2
(45) Date of Patent: Dec. 1, 2015

(54) FALSE-BRAKE PREVENTION DEVICE

(75) Inventor: Jianhui Cheng, Guangdong (CN)

(73) Assignee: Wonderland Nurserygoods Company Limited, Kwai Chung, N.T. (HK)

( * ) Notice: Subject to any disclaimer, the term of this patent is extended or adjusted under 35 U.S.C. 154(b) by 359 days.

(21) Appl. No.: 13/591,193

(22) Filed: Aug. 21, 2012

(65) Prior Publication Data

US 2013/0180805 A1  Jul. 18, 2013

(30) Foreign Application Priority Data

Jan. 18, 2012  (CN) .......................... 2012 1 0016985

(51) Int. Cl.
*B62B 9/08* (2006.01)
*B60T 1/00* (2006.01)
*B62B 5/04* (2006.01)

(52) U.S. Cl.
CPC ................ *B62B 9/082* (2013.01); *B62B 9/087* (2013.01); *B60T 1/005* (2013.01); *B62B 5/0433* (2013.01)

(58) Field of Classification Search
CPC ...... B62B 9/082; B62B 9/087; B62B 5/0433; B60T 1/005
USPC ....................... 188/19, 20, 31, 1.12
See application file for complete search history.

(56) References Cited

U.S. PATENT DOCUMENTS

| 2005/0006185 A1* | 1/2005 | Kassai et al. ..................... 188/19 |
| 2007/0045055 A1* | 3/2007 | Lan ................................ 188/20 |
| 2008/0073878 A1* | 3/2008 | Li .................................. 280/642 |
| 2008/0185236 A1* | 8/2008 | Chen et al. ...................... 188/20 |
| 2010/0326775 A1* | 12/2010 | Chen .............................. 188/20 |
| 2013/0112509 A1* | 5/2013 | Henry ............................. 188/20 |
| 2013/0180805 A1* | 7/2013 | Cheng ............................ 188/20 |

* cited by examiner

*Primary Examiner* — Robert A Siconolfi
*Assistant Examiner* — Charles Poon
(74) *Attorney, Agent, or Firm* — Winston Hsu; Scott Margo

(57) ABSTRACT

A false-brake prevention device includes a wheel shaft, a positioning structure, a protruding pillar, a wheel hub rotatably disposed on the wheel shaft, a brake base connected to the wheel shaft, and a brake pedal pivotally connected to the brake base and having a brake lever for engaging with a brake tooth structure of the wheel hub. The positioning structure is formed on one of the brake pedal and the brake base, and has lock and release slots and an elastic portion formed therebetween. A first return region is connected to a transition region and formed on a side surface of the elastic portion with a gradually reducing height from the transition region to the lock slot. The protruding pillar is formed on the other one of the brake pedal and the brake base for pushing the elastic portion and for engaging with the lock slot or the release slot.

10 Claims, 11 Drawing Sheets

FALSE-BRAKE PREVENTION DEVICE

BACKGROUND OF THE INVENTION

1. Field of the Invention

The present invention relates to a brake device, and more specifically, to a false-brake prevention device.

2. Description of the Prior Art

As shown in FIG. 1, a brake device of a conventional stroller includes a wheel 20, a brake base 10 installed on the wheel 20 having a brake tooth structure 30 with a plurality of brake slots, and a brake pedal 40 pivotally connected to the brake base 10. The brake pedal 40 has a brake lever 401, a lock slot 402, a release slot 403, and an elastic portion 404 formed between the lock slot 402 and the release slot 403. A protruding pillar 101 is correspondingly disposed on the brake base 10 for engaging with the lock slot 402 or the release slot 403. When a user treads the brake pedal 40, the brake pedal 40 is rotated relative to the brake base 10 to cause the lock slot 402 to be engaged with the protruding pillar 101 and the brake lever 401 to be engaged with one of the brake slots, so as to prevent the wheel 20 from rotating. When the user lifts the brake pedal 40, the brake lever 401 is retracted from the brake slot and the release slot 403 is rotated to be engaged with the protruding pillar 101, so as to make the wheel 20 rotatable.

However, the hidden danger of the aforesaid brake device is that the false-brake problem may occur easily as shown in FIG. 2 when the user operates the aforesaid brake device to brake the wheel 20. To be more specific, when the false-brake problem occurs, one top end of the brake tooth structure 30 abuts against the brake lever 401 of the brake pedal 40 so as to prevent the brake lever 401 from being engaged with one brake slot of the brake tooth structure 30. Accordingly, the user may misunderstand that the wheel 20 has already been in a lock state as the top end of the brake tooth 30 keeps abutting against the brake lever 401 of the brake pedal 40. Furthermore, as shown in FIG. 3, a side surface of the elastic portion 404 corresponding to the protruding pillar 101 is a smooth surface. Thus, when the protruding pillar 101 pushes the elastic portion 404 to deform outwardly, improper engagement of the protruding pillar 101 and the elastic portion 404 may easily prevent the elastic portion 404 from rotating to a position where the lock slot 402 is engaged with the protruding pillar 101. Under this circumstance, once the stroller receives a sudden impact, the brake lever 401 may be disengaged from the brake tooth structure 30 easily to release the aforesaid brake device. At this time, it is dangerous if the stroller is located on a slope.

SUMMARY OF THE INVENTION

The present invention provides a false-brake prevention device including a wheel shaft, a wheel hub, a brake base, a brake pedal, at least one positioning structure, and a protruding pillar. The wheel hub is rotatably disposed on the wheel shaft and has a brake tooth structure. The brake base is connected to the wheel shaft. The brake pedal is pivotally connected to the brake base and has a brake lever for engaging with the brake tooth structure. The positioning structure is formed on one of the brake pedal and the brake base and has a lock slot, a release slot and an elastic portion formed between the lock slot and the release slot. A first return region and a transition region are formed on a side surface of the elastic portion. The first return region is connected to the transition region and the lock slot with a gradually reducing height from the transition region to the lock slot. The protruding pillar is formed on the other one of the brake pedal and the brake base for pushing the elastic portion and for engaging with the lock slot or the release slot.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
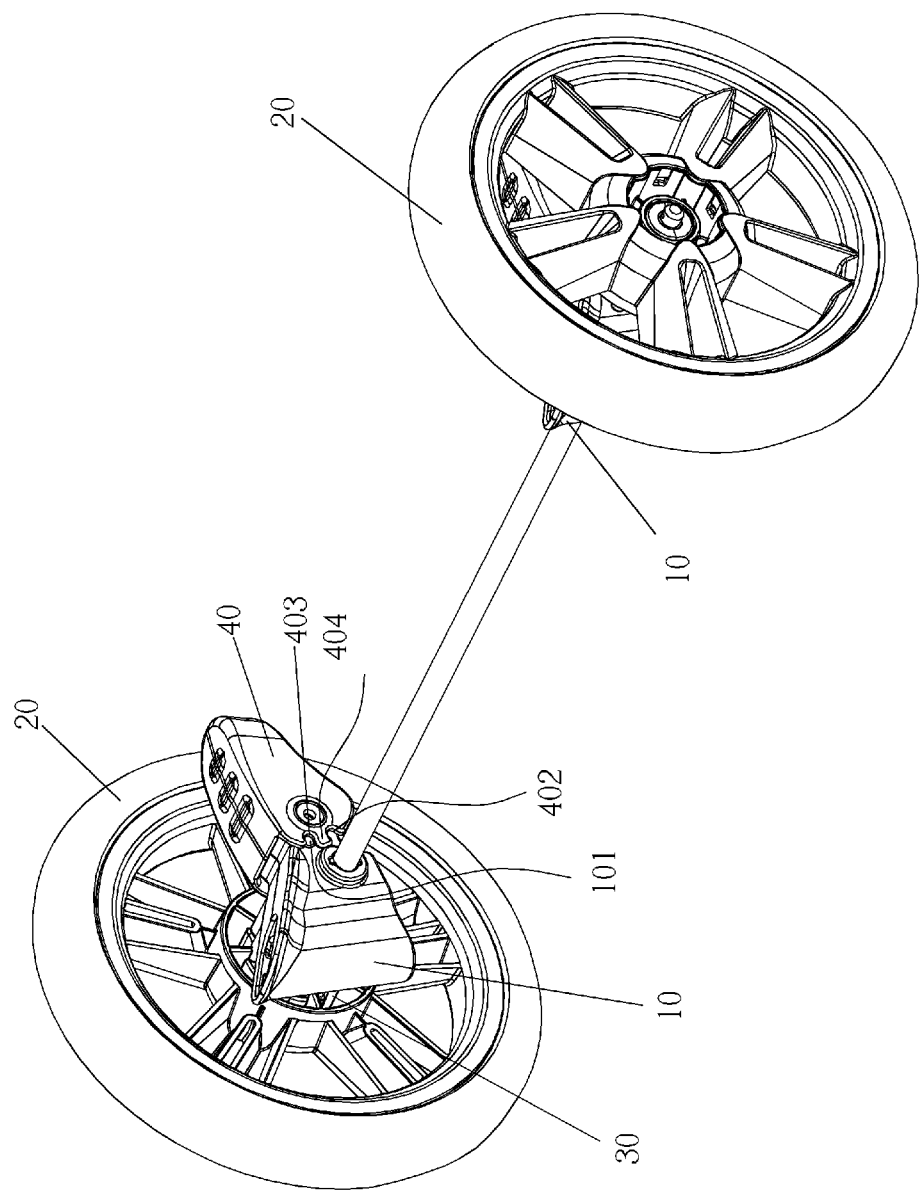
FIG. 1 is a diagram of a brake device according to the prior art.
Figure 2:
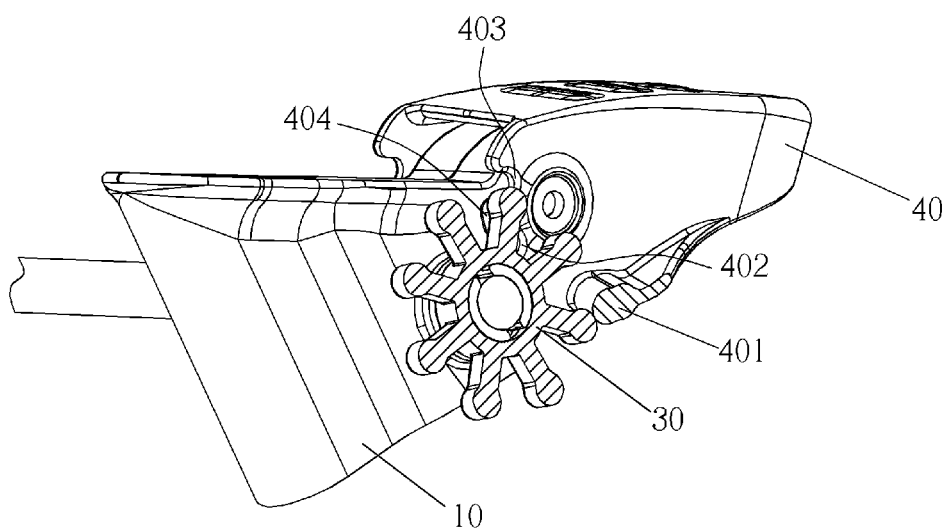
FIG. 2 is a diagram of the brake device in FIG. 1 in a false-brake state.
Figure 3:
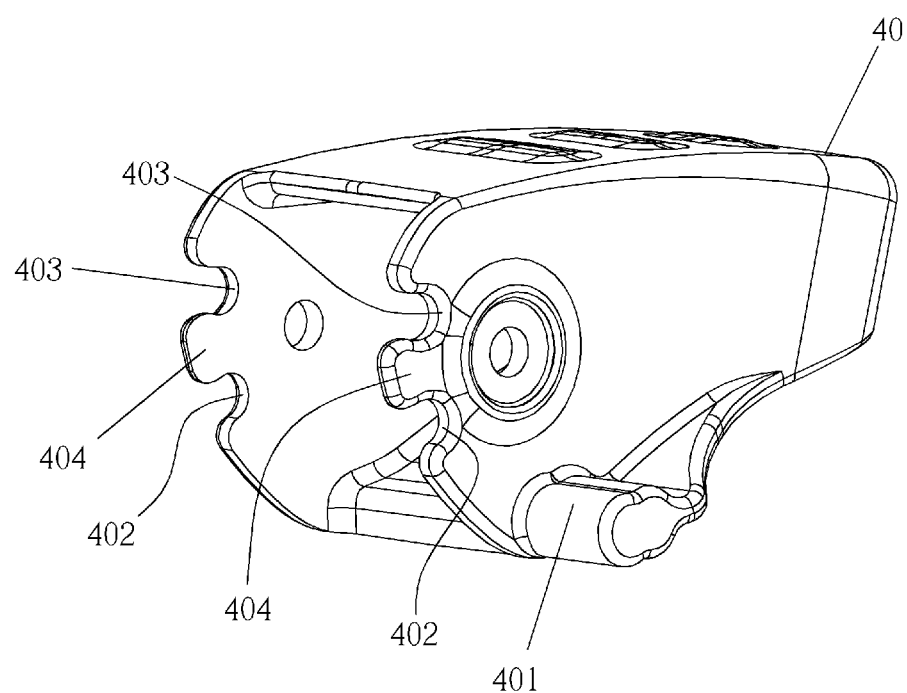
FIG. 3 is an enlarged diagram of a brake pedal in FIG. 1.
Figure 4:
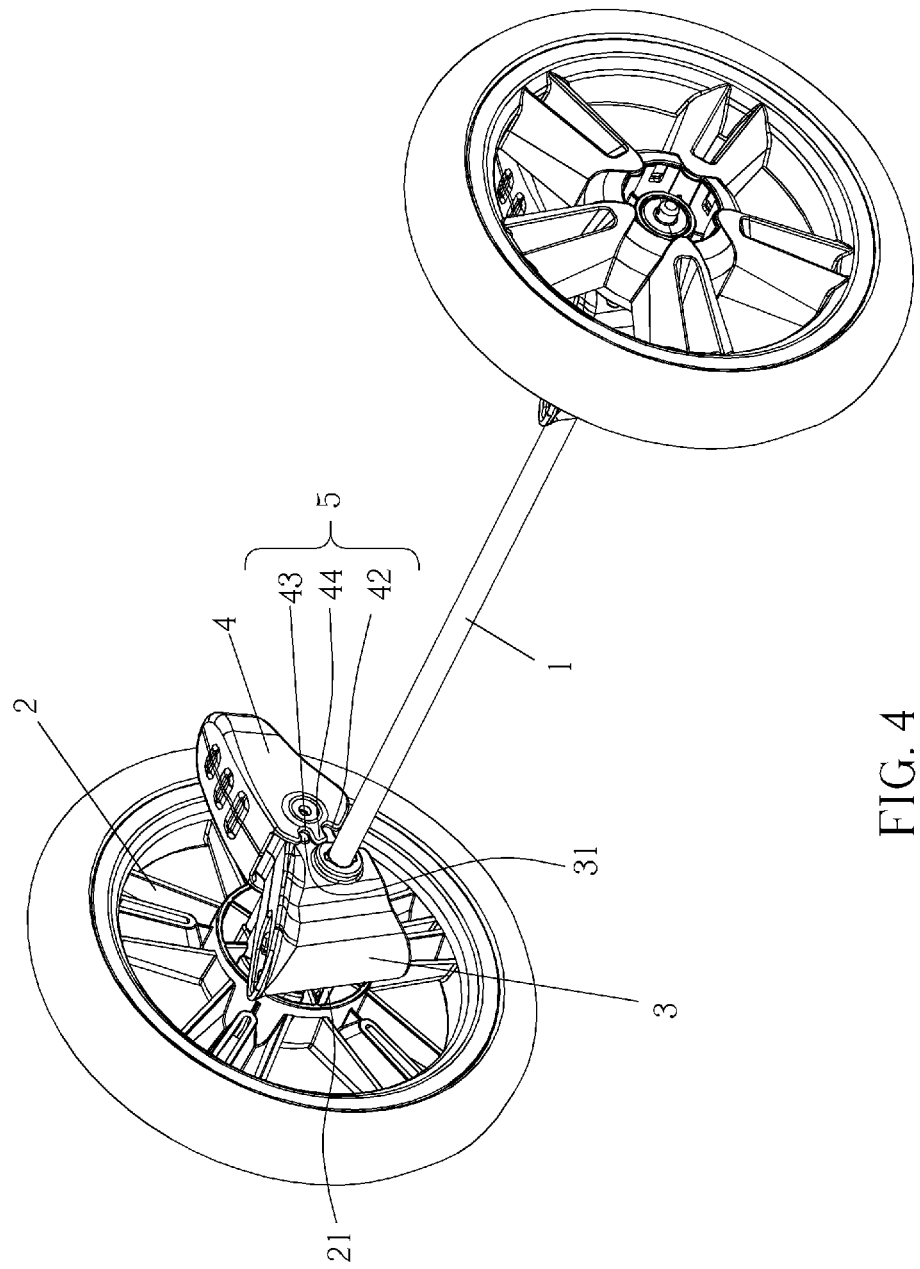
FIG. 4 is a diagram of a false-brake prevention device according to a first embodiment of the present invention.

Further description for the present invention is provided as follows based on drawings and preferable embodiments.

As shown in FIGS. 4-8, a false-brake prevention device provided by the present invention, which is applied to a wheel of a stroller, includes a wheel shaft 1, a wheel hub 2 rotatably disposed on the wheel shaft 1 and having a brake tooth structure 21 disposed thereon, a brake base 3 connected to the wheel shaft 1, a brake pedal 4 pivotally connected to the brake base 3 and having a brake lever 41 disposed thereon for engaging with the brake tooth structure 21, and a positioning structure 5. In this embodiment, the positioning structure 5 is formed on the brake pedal 4 and has a lock slot 42, a release slot 43, and an elastic portion 44 formed between the lock slot 42 and the release slot 43. A protruding pillar 31 is disposed on the brake base 3 for engaging with the lock slot 42 or the release slot 43.

Figure 5:
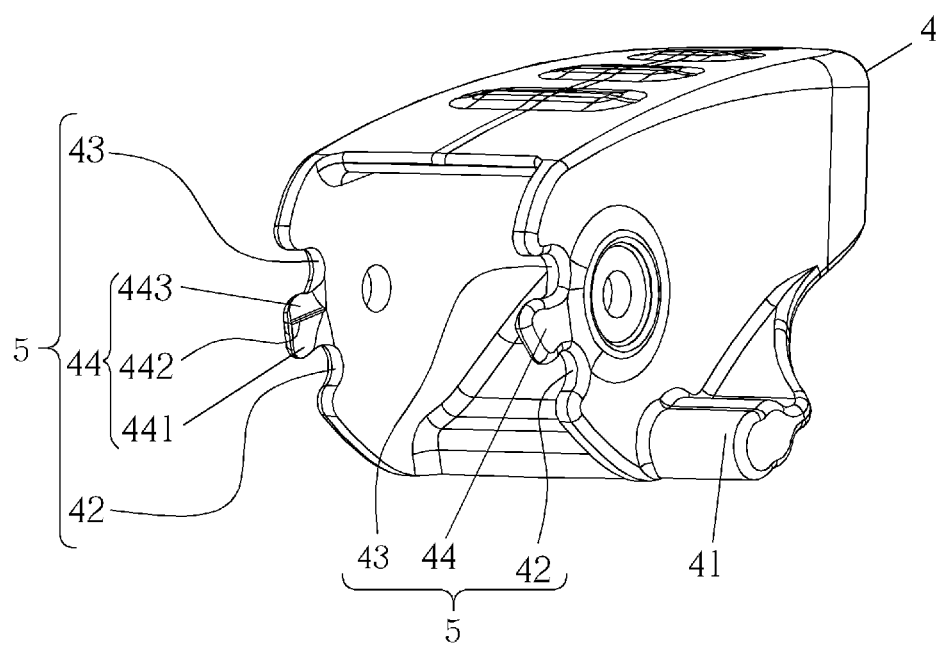
FIG. 5 is an enlarged diagram of a brake pedal in FIG. 4.
Figure 6:
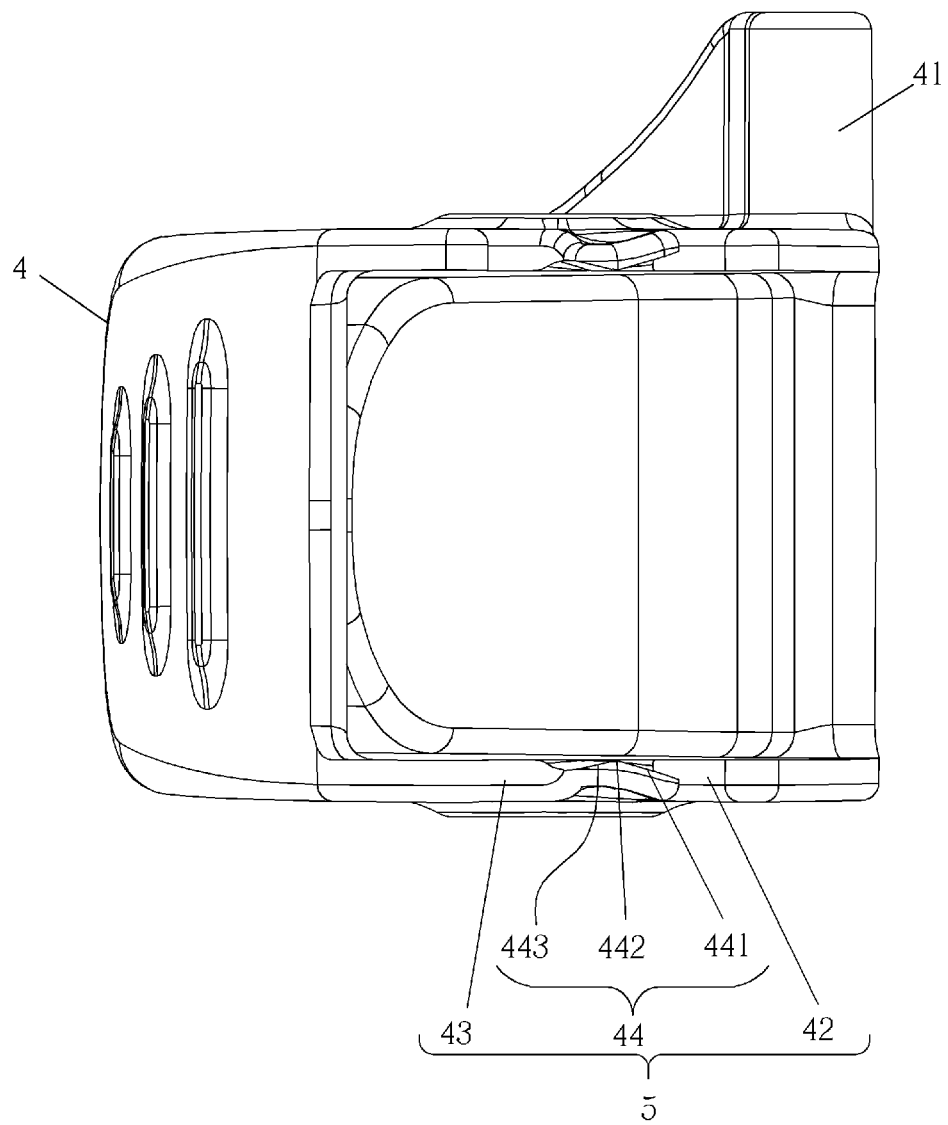
FIG. 6 is another view of the brake pedal in FIG. 5.
Figure 8:
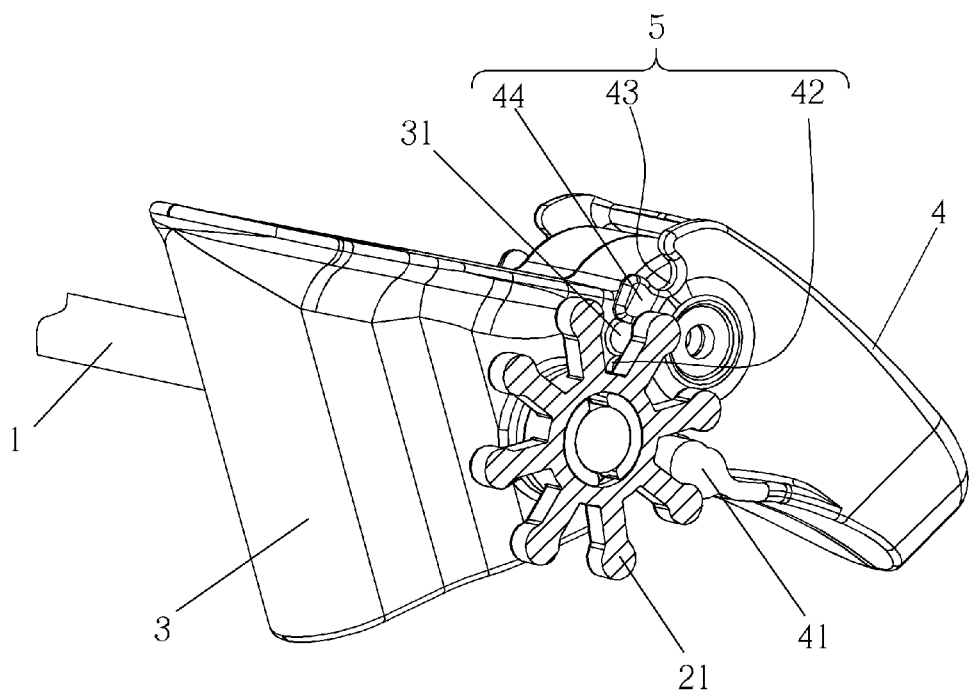
FIG. 8 is a diagram of the false-brake prevention device in FIG. 4 in a lock state.

As shown in FIG. 5 and FIG. 6, a first return region 441, a transition region 442, and a second return region 443 are formed on a side surface of the elastic portion 44 cooperating with the protruding pillar 31. Two ends of the first return region 441 are connected to the transition region 442 and the lock slot 42 respectively. The height of the first return region 441 is reduced gradually from the transition region 442 to the lock slot 42. Two ends of the second return region 443 are connected to the transition region 442 and the release slot 43 respectively. The height of the second return region 443 is reduced gradually from the transition region 442 to the release slot 43. Via the aforesaid disposition, when the protruding pillar 31 pushes the elastic portion 44 to deform outwardly, the elastic portion 44 may tend to move along an inclined direction of one of the first return region 441 and the second return region 443 if the protruding pillar 31 contacts the one of the first return region 441 and the second return region 443. In such a manner, if the protruding pillar 31 contacts the first return region 441 and the wheel in a false-brake state (at this time, the brake lever 41 is not engaged with the brake tooth structure 21) starts to rotate, the elastic portion 44 may move along the inclined direction of the first return region 441 automatically by its elasticity, so as to cause the protruding pillar 31 to be engaged with the lock slot 42 and cause the brake lever 41 to be engaged with a brake slot of the brake tooth structure 21 for preventing the wheel from rotating (as shown in FIG. 8).

Figure 7:
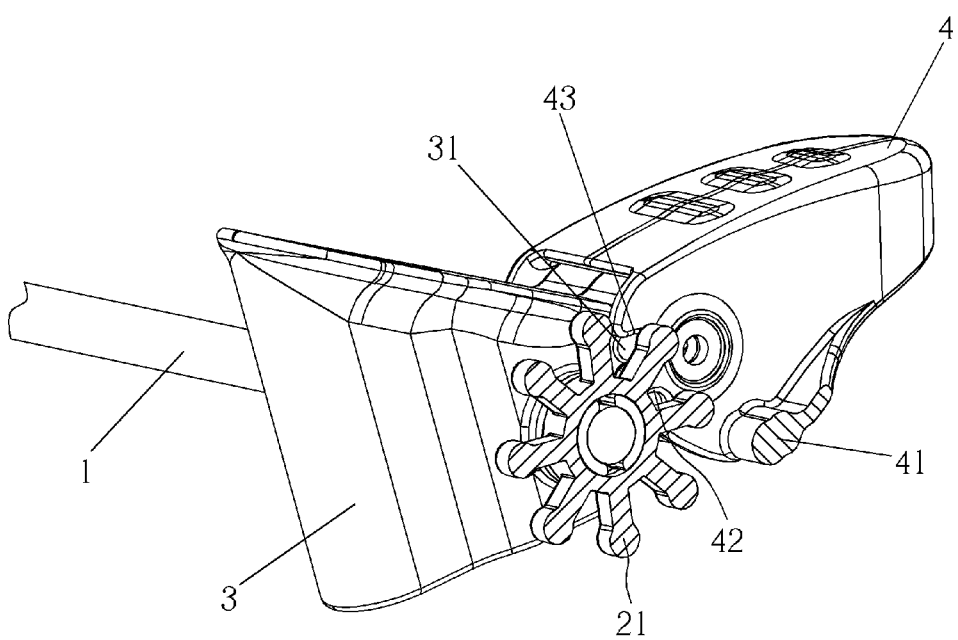
FIG. 7 is a diagram of the false-brake prevention device in FIG. 4 in a release state.

On the other hand, if the user lifts the brake pedal 40 to cause the protruding pillar 31 to contact the second return region 443 instead, the elastic portion 44 may move along the inclined direction of the second return region 443 automatically by its elasticity, so as to cause the brake lever 41 to be disengaged with the brake slot of the brake tooth structure 21 and cause the protruding pillar 31 to be engaged with the release slot 43. In such a manner, the false-brake prevention device provided by the present invention can further help the user release the wheel surely (as shown in FIG. 7).

In this embodiment, the second region 443 and the first region 441 are preferably an inclined surface, but not limited thereto. For example, the second region 443 and the first region 441 can also be an arc-shaped surface. Furthermore, in this embodiment, the wheel hub 2 can be integrally formed with the brake tooth structure 21.

To be noted, if the first return region 441 or the second return region 443 has an unobvious inclination, the moving trend of the elastic portion 44 along the inclined direction of the first return region 441 or the second return region 443 is also unobvious. However, if the second return region 443 or the first return region 441 is designed to have a greater inclination, the user may need to exert more force to lift or tread the brake pedal 4 and pushing of the protruding pillar 31 may cause the elastic portion 44 to have more deformation. As a result, the elastic portion 44 may be damaged easily. Thus, an inclined angle of the second return region 443 and an inclined angle of the first return region 441 are preferably between 15° and 60°.

In this embodiment, for making engagement of the brake pedal 4 and the brake base 3 much tighter, the elastic portion 44 can be an elastic tongue sheet, the brake pedal 4 can be pivotally connected to the brake base 3, the lock slot 42 and the release slot 43 can be formed on two sides of the brake pedal 4, and the protruding pillar 31 can be formed on two sides of the brake base 3 respectively for engaging with the corresponding lock slot 42 or the corresponding release slot 43.

Figure 9:
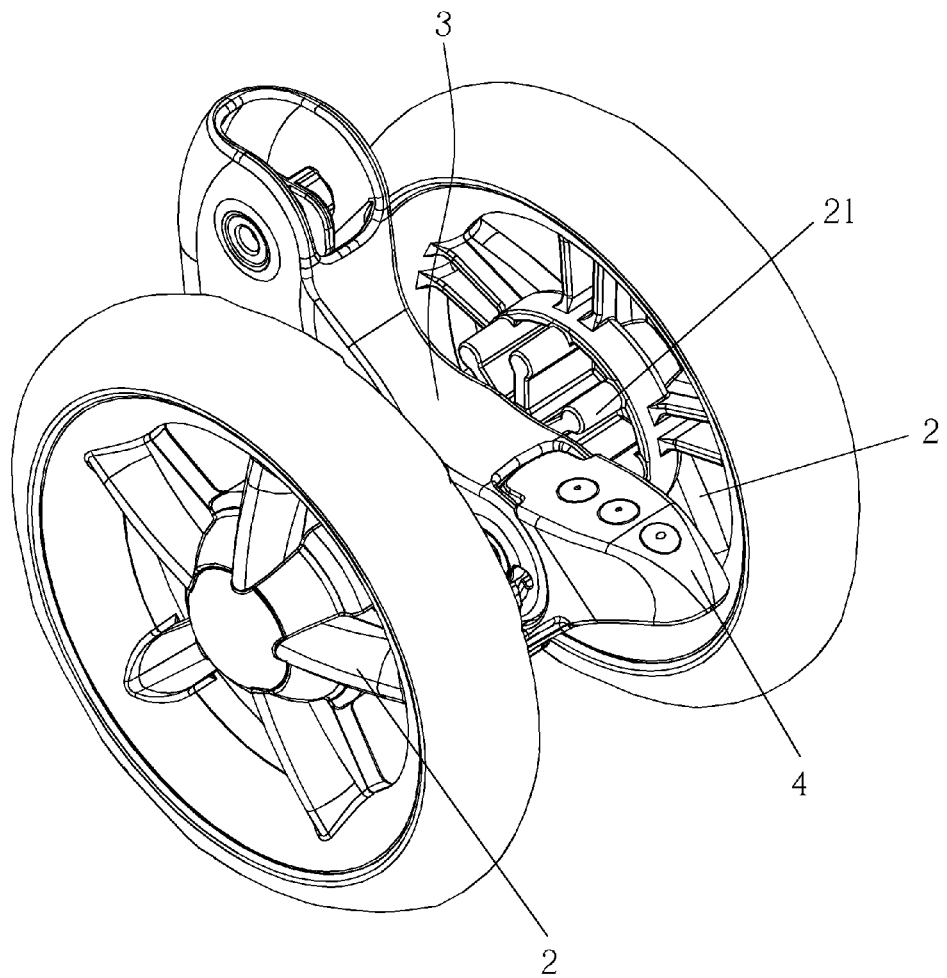
FIG. 9 is a diagram of a false-brake prevention device according to a second embodiment of the present invention.
Figure 10:
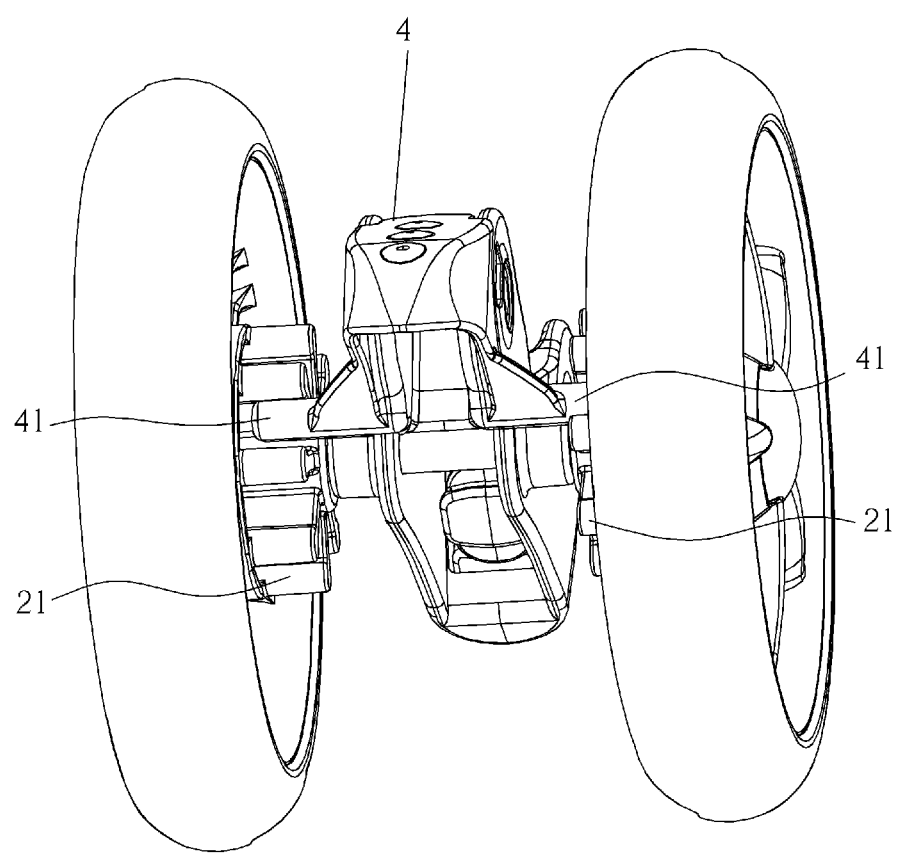
FIG. 10 is another view of the false-brake prevention device in FIG. 9.
Figure 11:
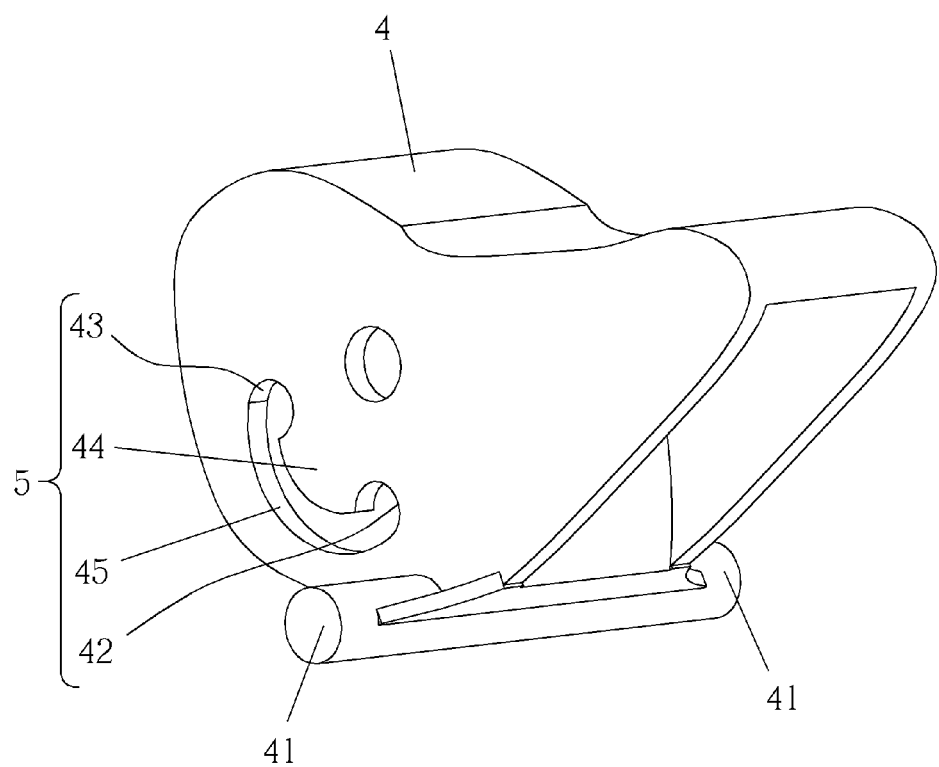
FIG. 11 is an enlarged diagram of a brake pedal in FIG. 9.

FIGS. 9-11 depict a second embodiment of the present invention. The difference between the second embodiment and the first embodiment is that the positioning structure 5 further has a sliding slot 45 formed thereon and the lock slot 42 is communicated with the release slot 43 via the sliding slot 45. In such a manner, when the protruding pillar 31 pushes the elastic portion 44 to deform outwardly, the elastic force provided by the elastic portion 44 can drive the protruding pillar 31 to be engaged with the lock slot 42 or the release slot 43 surely by guidance of the sliding slot 45. In this embodiment, two sides of the brake pedal 4 can have the brake lever 41 respectively for achieving the purpose of braking two wheels of the stroller simultaneously.

The present invention utilizes the aforesaid design in which the first return region 441, the transition region 442, and the second return region 443 are disposed on the elastic portion 44, the first return region 441 is connected to the transition region 442 and the lock slot 42 with a gradually reducing height from the transition region 442 to the first return region 441, and the second return region 443 is connected to the transition region 442 and the release slot 43 with a gradually reducing height from the transition region 442 to the second return region 443, to make the elastic portion 44 tend to move along the inclined direction of the first return region 441 or the second return region 443 when the protruding pillar 31 pushes the elastic portion 44 to deform outwardly. In such a manner, when the wheel in the said false-brake state rotates to make the top end of the brake tooth structure 21 no longer abut against the brake pedal 4, the elastic portion 44 can move along the inclined direction of the first return region 441 automatically by its elasticity, so as to cause the brake lever 41 to be engaged with a brake slot of the brake tooth structure 21 for preventing the wheel from rotating. Thus, the false-brake prevention device provided by the present invention can solve the said false-brake problem efficiently, so as to improve the operational reliability and safety of the stroller.

The present invention further provides another embodiment. The difference between this embodiment and the aforesaid embodiments is that the positioning structure 5 is disposed on the brake base 3 and the protruding pillar 31 is disposed on the brake pedal 4 instead. The other structural designs in this embodiment are the same as those in the aforesaid embodiments, and the related description is therefore omitted herein.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A false-brake prevention device comprising:
   a wheel shaft;
   a wheel hub rotatably disposed on the wheel shaft and having a brake tooth structure;
   a brake base connected to the wheel shaft;
   a brake pedal pivotally connected to the brake base and having a brake lever for engaging with the brake tooth structure;
   at least one positioning structure formed on one of the brake pedal and the brake base and having a lock slot, a release slot and an elastic portion formed between the lock slot and the release slot, a first return region, a second return region and a transition region being formed on a side surface of the elastic portion facing the one of the brake pedal and the brake base, the transition region being protruded toward the other one of the brake pedal and the brake base, the first return region being connected to the transition region and the lock slot with a gradually reducing height relative to the side surface from the transition region to the lock slot, the second return region being connected to the transition region and the release slot with a gradually reducing height relative to the side surface from the transition region to the release slot; and
   a protruding pillar formed on the other one of the brake pedal and the brake base and protruded toward the one of the brake pedal and the brake base to abut against the elastic portion for pushing the elastic portion to deform outwardly and for engaging with the lock slot or the release slot, the elastic portion tending to move relative to the protruding pillar along the first return region by elastic deformation of the elastic portion when the protruding pillar pushes the elastic portion to deform outwardly and the protruding pillar contacts with the first return region, so as to cause the protruding pillar to be engaged with the lock slot and cause the brake lever to be engaged with the brake tooth structure, and the elastic portion tending to move relative to the protruding pillar along the second return region by the elastic deformation of the elastic portion when the protruding pillar pushes the elastic portion to deform outwardly and the protruding pillar contacts with the second return region, so as to cause the protruding pillar to be engaged with the release slot and cause the brake lever to be disengaged from the brake tooth structure.

2. The false-brake prevention device of claim 1, wherein the first return region is an inclined surface.

3. The false-brake prevention device of claim 2, wherein an inclined angle of the first return region is between 15° and 60°.

4. The false-brake prevention device of claim 1, wherein the first return region is an arc-shaped surface.

5. The false-brake prevention device of claim 1, wherein the second return region is an inclined surface.

6. The false-brake prevention device of claim 5, wherein an inclined angle of the second return region is between 15° and 60°.

7. The false-brake prevention device of claim 1, wherein the second return region is an arc-shaped surface.

8. The false-brake prevention device of claim 1, wherein the position structure further has a sliding slot communicated with the lock slot and the release slot.

9. The false-brake prevention device of claim 1, wherein the elastic portion is an elastic tongue sheet.

10. The false-brake prevention device of claim 1, wherein both two sides of the brake pedal have the lock slot and the release slot formed thereon, and two sides of the brake base have the protruding pillar respectively for engaging with the corresponding lock slot or the corresponding release slot.

\* \* \* \* \*